United States Patent
Odaohhara et al.

(10) Patent No.: US 6,820,205 B2
(45) Date of Patent: Nov. 16, 2004

(54) ELECTRIC POWER UNIT WITH A BATTERY AND A MEMORY FOR RECORDING THE DATE OF FIRST USE OF THE BATTERY

(75) Inventors: Shigefumi Odaohhara, Yamato (JP); Arimasa Naitoh, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 09/788,812

(22) Filed: Feb. 20, 2001

(65) Prior Publication Data

US 2002/0016931 A1 Feb. 7, 2002

(30) Foreign Application Priority Data

Feb. 22, 2000 (JP) .................................... 2000-044634

(51) Int. Cl.⁷ ............................................... G06F 1/26
(52) U.S. Cl. .................................... 713/300; 713/310
(58) Field of Search ............................. 713/300, 310, 713/340; 320/106, 112

(56) References Cited

U.S. PATENT DOCUMENTS 5,608,306 A * 3/1997 Rybeck et al. ............... 320/106
6,359,417 B1 * 3/2002 Winkler ....................... 320/106
6,366,809 B1 * 4/2002 Olson et al. ..................... 607/5

FOREIGN PATENT DOCUMENTS

JP 2000060007 A * 2/2000 ............. H02J/7/00

OTHER PUBLICATIONS

"Automatic Battery Discharge using Real Time Clock", IBM Technical Disclosure Bulletin, Apr. 1, 1994, US, pp. 189-192.*

* cited by examiner

*Primary Examiner*—Lynne H. Browne
*Assistant Examiner*—Paul Yanchus, III
(74) *Attorney, Agent, or Firm*—Louis P. Herzberg

(57) ABSTRACT

To obtain an electric power unit, an electric power controller, and an electric power controlling method that can know a date for starting use of an electric power unit respectively, as well as to obtain a computer that can know a date for starting the use of the built-in electric power unit. There is provided a main battery 64A, which is an electric power unit, with a memory 104 for storing data denoting a date for starting the use of the main battery 64A so as to store the data of the battery use starting date in the memory 104 via a CPU 102 just once when using of the main battery 64A is started actually by the embedded controller 80. To know the date on which using of the main battery is started, the embedded controller 80 is used to read the date from the memory 104.

11 Claims, 9 Drawing Sheets

[Figure 1]
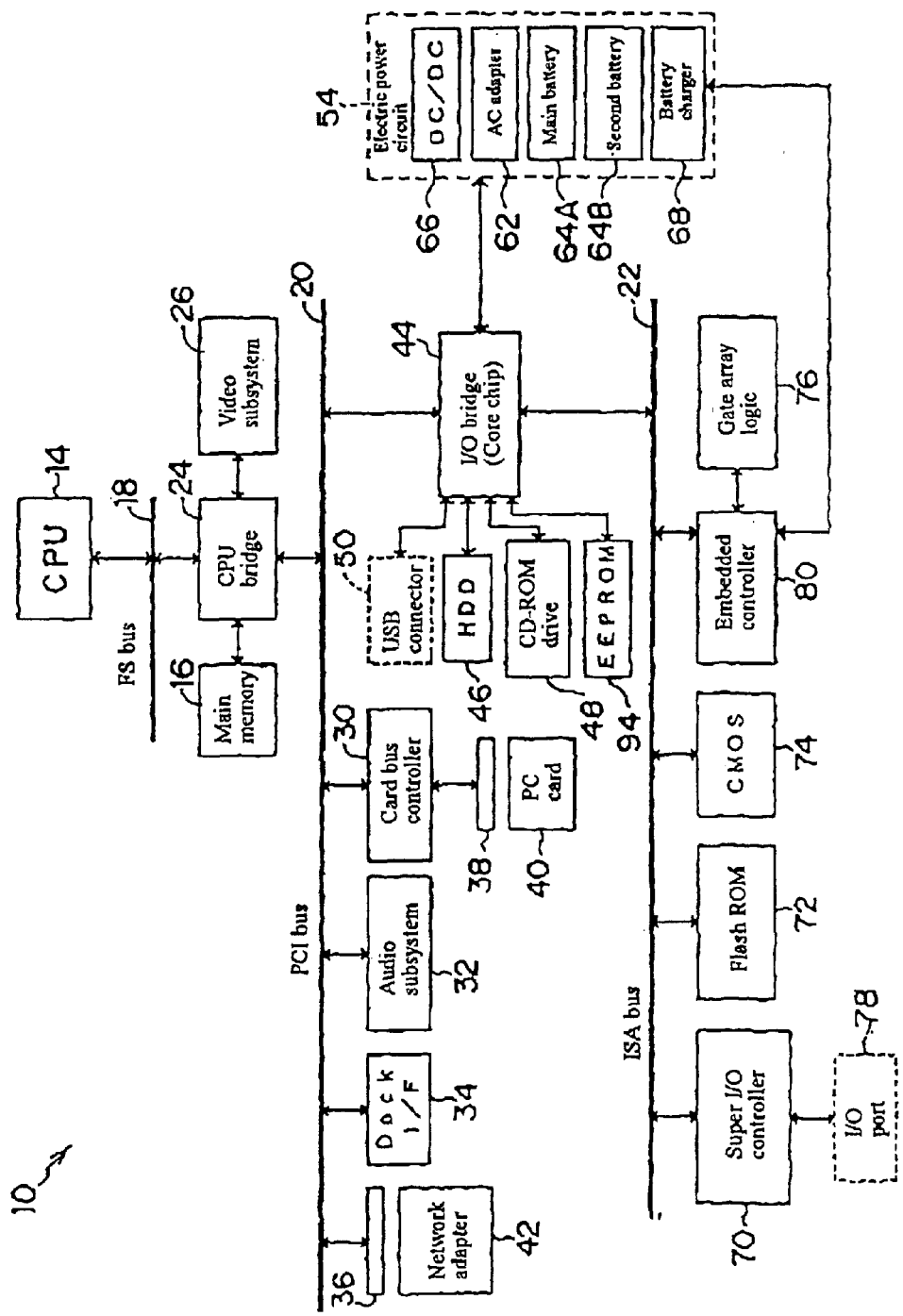

[Figure 2]
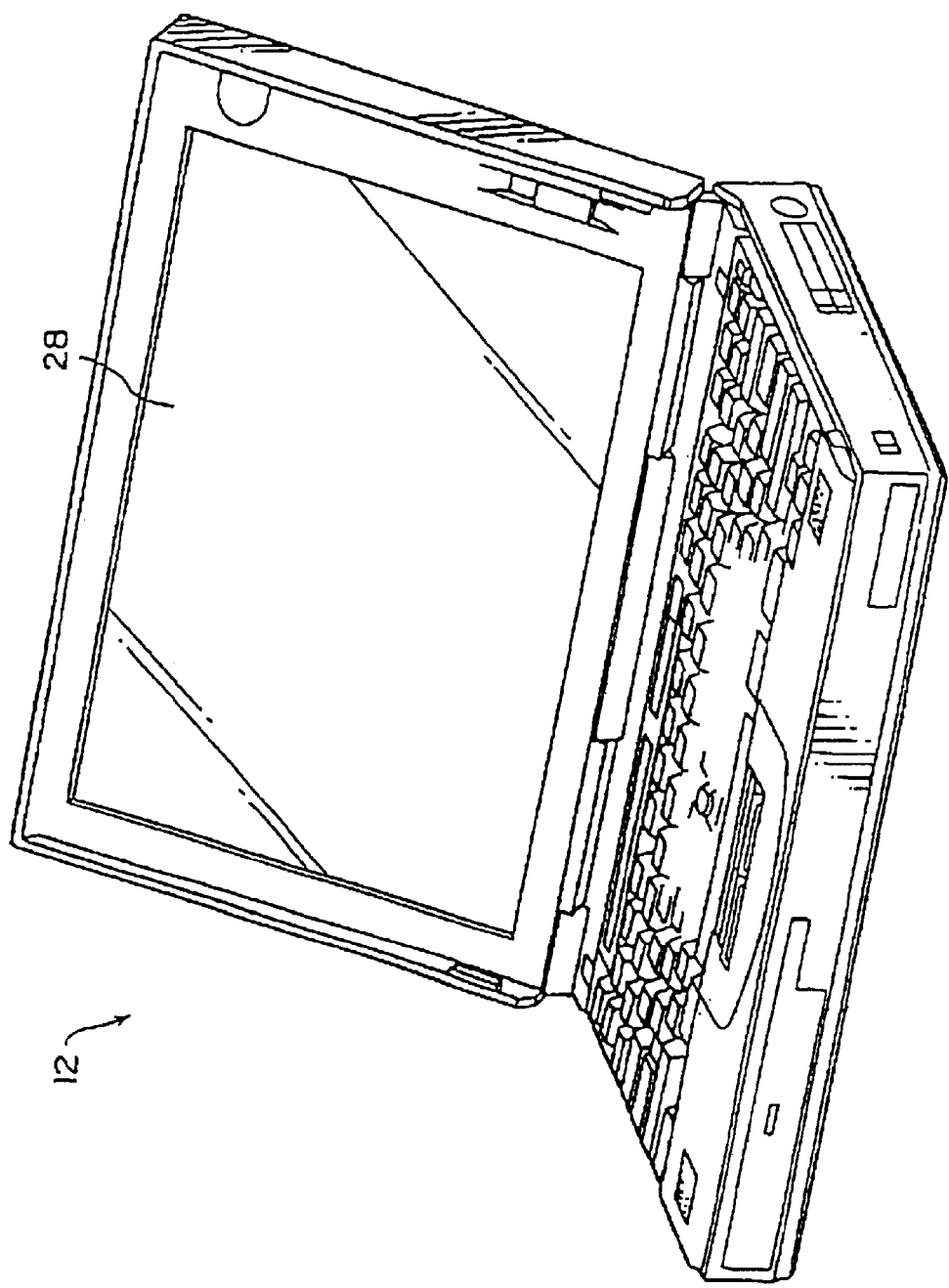

[Figure 3]
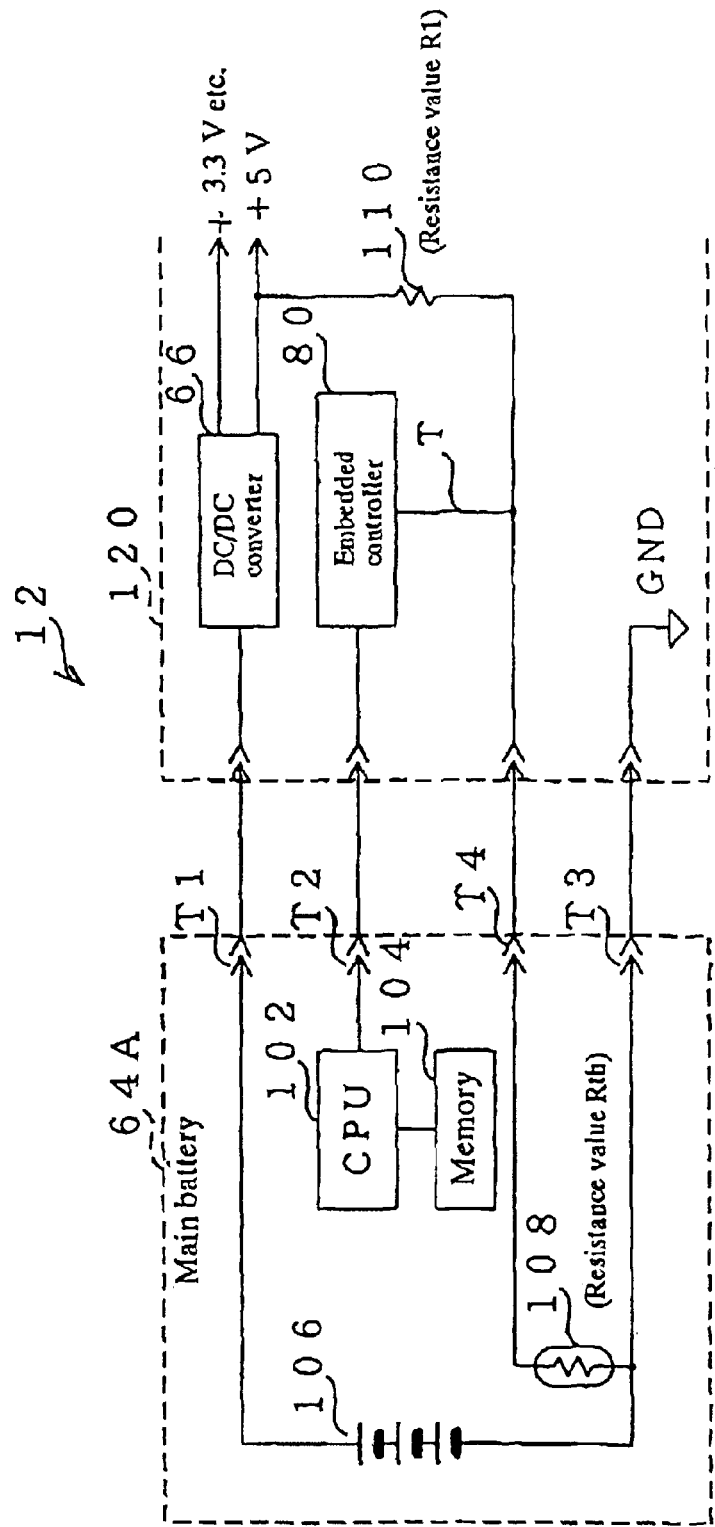

[Figure 4]

| Maker name | IBM |
|---|---|
| Delivery date | 2000/08/20 |
| Use starting date | 2000/12/25 |
| Serial number | 123456 |
| Barcode number | 987654 |
| Battery name | Smart battery |
| Battery type | Lithium-ion |
| Rated capacity | 5832mAH |
| Rated voltage | 10800mV |

[Figure 5]
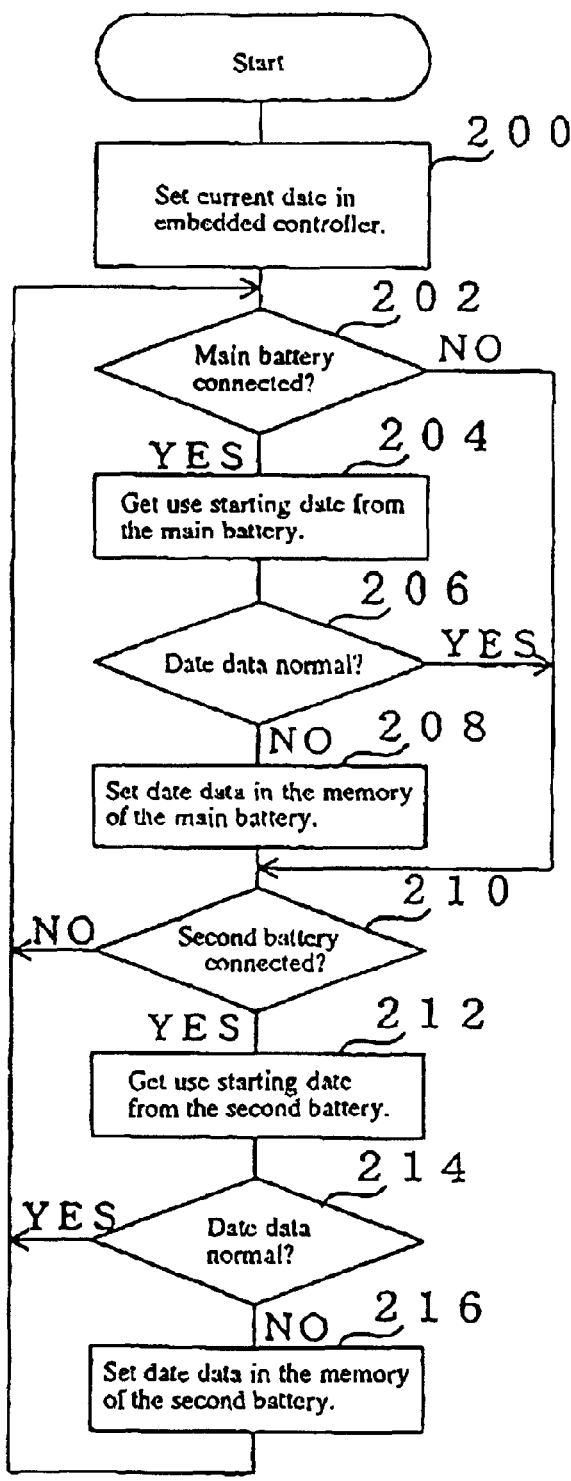

[Figure 6]
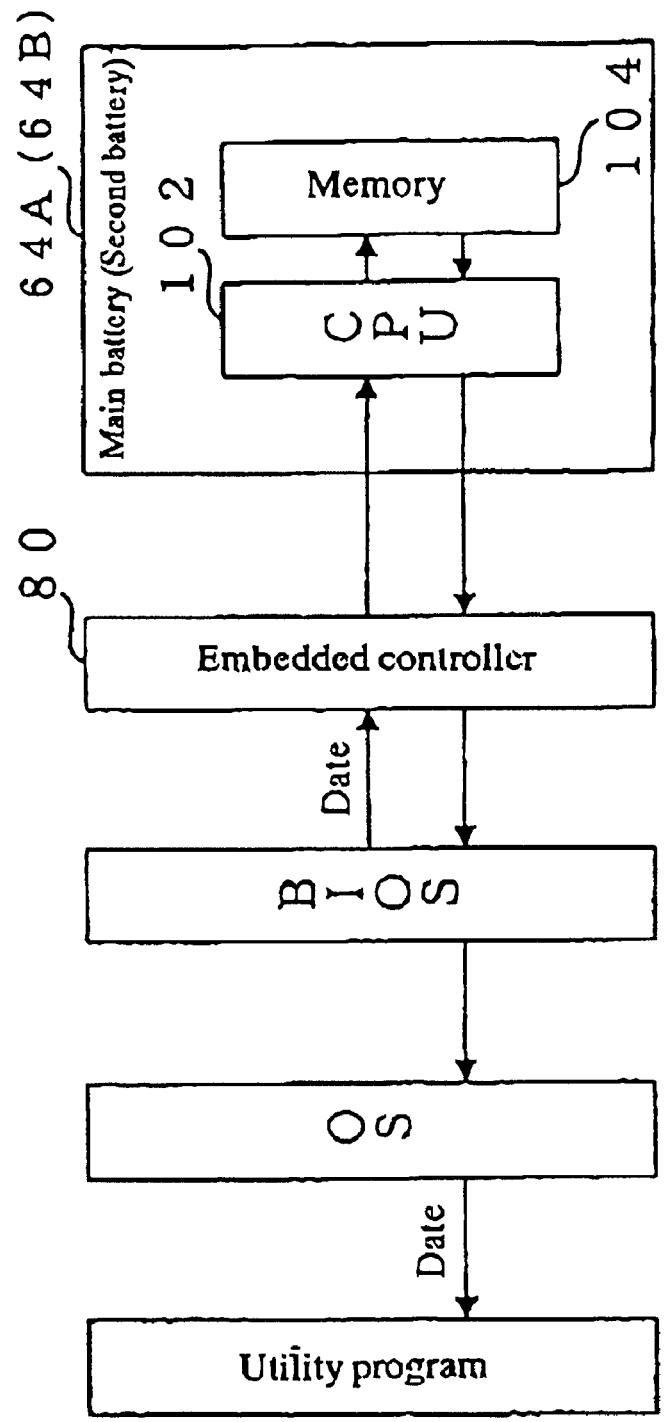

[Figure 7]
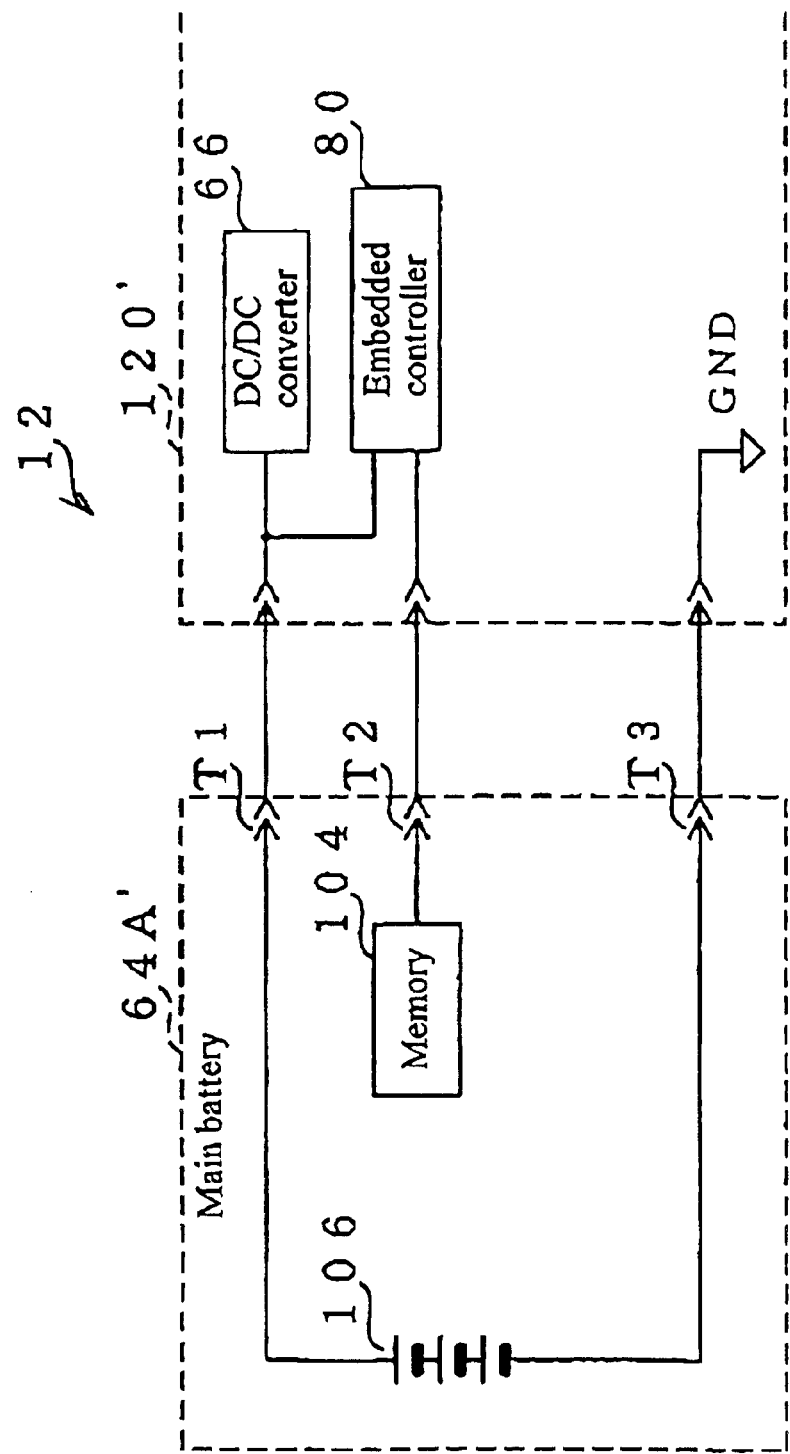

[Figure 8]
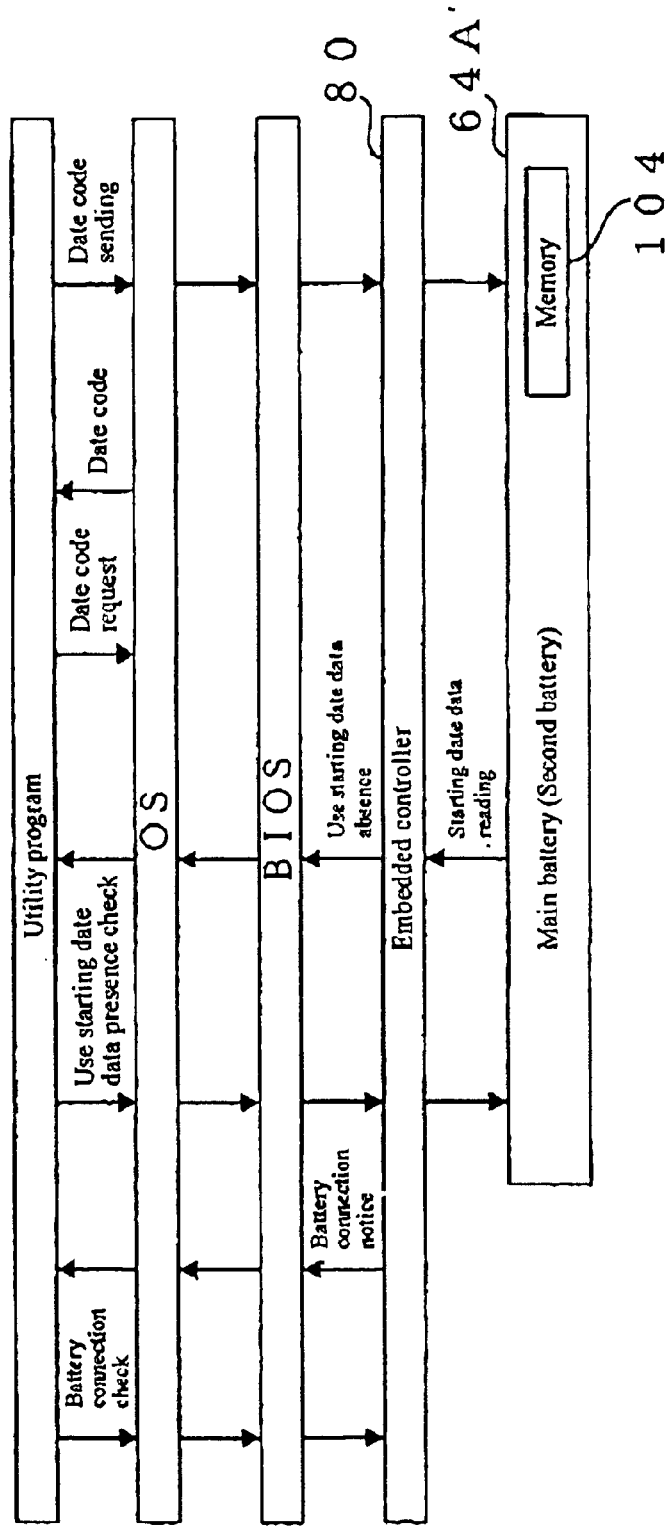

[Figure 9]
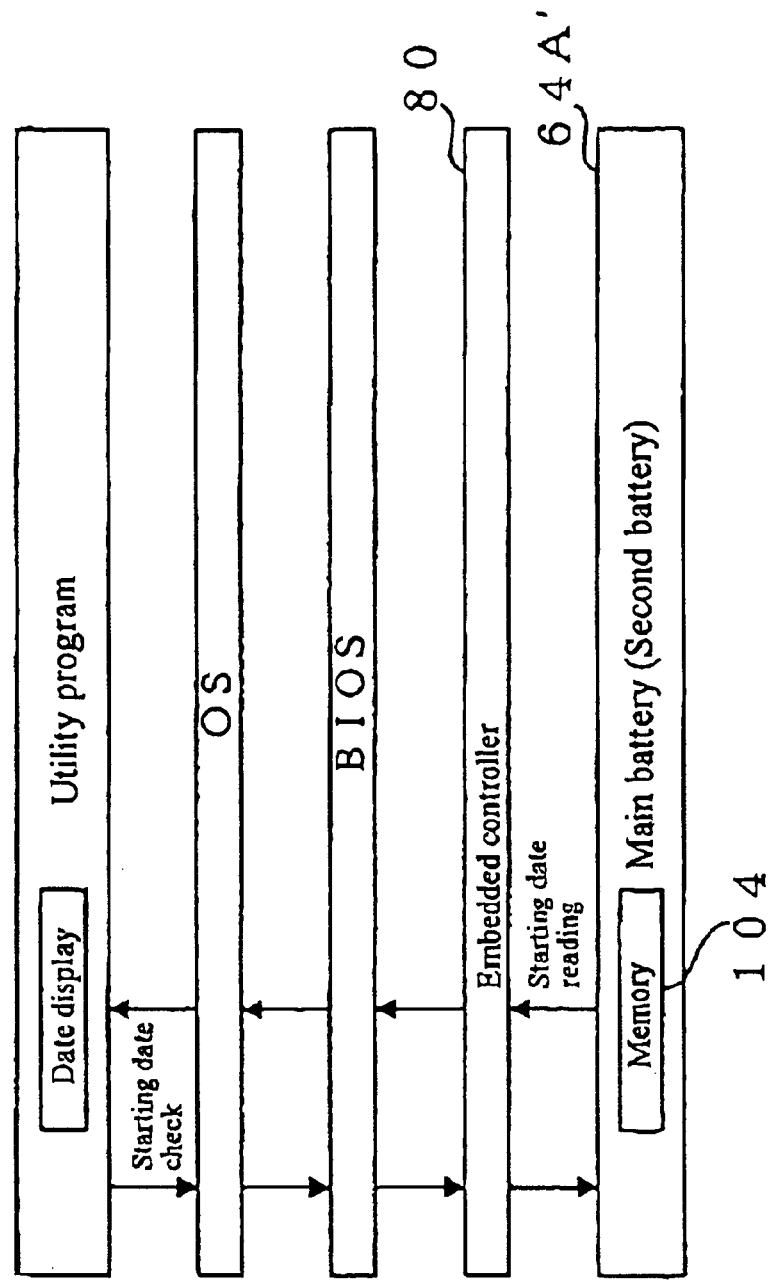

ELECTRIC POWER UNIT WITH A BATTERY AND A MEMORY FOR RECORDING THE DATE OF FIRST USE OF THE BATTERY

DETAILED DESCRIPTION OF THE INVENTION

1. Field of the Invention

The present invention relates to an electric power unit, an electric power controller, an electric power controlling method, and a computer, more particularly to an electric power unit provided with a battery enabled to supply an electric power to an external device, an electric power controller and an electric power controlling method that control the electric power unit, and a computer that employs the electric power controlling method.

2. Background Art

In recent years, there have appeared portable personal computers (hereinafter, to be referred to as a portable PC respectively) developed in various size and provided with various functions so as to cope with the required spread of mobile computing. For example, there are lap-top personal computers, more compact lap-top personal computers, palm-top personal computers, PDA (Personal Data Assistants) devices, etc.

A portable PC has a battery built in itself. And, due to this built-in battery, the user can use the portable PC even under an environment in which no commercial electric power source is available, for example, in a train. Generally, a secondary battery that can be charged for repetitive use is employed as such a battery described above.

While such the secondary battery is employed widely for home electric appliances including such the portable PC, etc., an intelligent battery with an electronic circuit integrated therein is now attracting a great deal of attention. According to this intelligent battery, the electronic circuit integrated in the battery can communicate the battery residual capacity to the connected external device very accurately. Consequently, for example, in case such an intelligent battery is employed for a portable PC as a secondary battery, the user can know how much the residual capacity of the secondary battery is before it is used up while using a portable PC under an environment in which no commercial electric power source is available. The user can thus prevent the PC from being shut down abruptly during an operation.

Problems to be Solved by the Invention

On the other hand, makers (manufacturers) of portable PCs and/or home electric appliances provided with such a secondary battery respectively have been confronted with a problem. Concretely, they have to bear a great deal of cost for replacing the secondary battery free of charge almost unconditionally in case they receive complaints from users that the operation time of the secondary battery is short and/or the battery does not work, etc.

That is, such the secondary battery provided as an intelligent battery, etc. has no means for knowing a date on which the user starts the use of his/her delivered portable PC, a home electric appliance, or the like with such the battery built therein, although the secondary battery has a predetermined warranty period (ex., one year). It has thus been impossible to know whether or not the warranty period of the subject secondary battery is still valid. And, this is why the makers (manufacturers) have to accept the replacement of the battery free of charge.

In the same way, the user has also confronted with an inconvenience; it is difficult for the user to judge whether or not the warranty period of the secondary battery is still valid and/or when the user should replace it with a new one.

Under such circumstances, it is an object of the present invention to provide an electric power unit, an electric power controller, and an electric power controlling method that can know when the use of the battery is started, as well as to provide a computer that can know when the use of a built-in electric power unit is started.

SUMMARY OF THE INVENTION

The electric power unit of the present invention is provided with a battery enabled to supply an electric power to an external device and a memory in/from which data can be written/read from the external device. The memory stores at least information denoting when the use of the above battery is started. The battery use starting information may include all of the day, the month, and the year in which the use of the battery is started. The information may include only the year, only the year and the month, and only the month and the day. In case information that denotes the production date, the delivery date, etc. is stored in the memory, the information may denote, for example, "three months" as a date difference information from the original date information in case using of the subject battery is started three month after it is delivered.

Because the electric power unit is provided with a memory that stores at least battery use starting information so as to be written/read from an external device such way, the user and/or the maker can read the battery use starting information from the memory, thereby knowing when the use of the electric power unit is actually started.

The memory described above should preferably enable the user to write such data only once. Consequently, the electric power unit can be protected from illegal rewriting of the use starting information.

The electric power unit of the present invention should preferably be further provided with information exchange controller for controlling exchanges of information between the memory and an external device. Consequently, the electric power unit memory can be accessed more easily from the external device.

Furthermore, the electric power unit of the present invention should preferably be provided with a terminal for outputting a signal to the external device. The signal denotes whether or not the battery supplies an electric power to the external device. Consequently, it is possible for the external device to decide whether or not the electric power unit is connected to a destination device, thereby the external device can access the memory only when the electric power unit is connected to the destination device.

On the other hand, the electric power controller and the electric power controlling method of the present invention are used to control the electric power unit of the present invention so that the battery use starting information is stored in the memory of the electric power unit in case it is not stored in the memory. Consequently, the user and/or the maker can read the use starting information from the memory so as to know when the use of the electric power unit is started actually. And, according to the present invention, because the operation for storing such the use starting information is omitted in case the information is already stored in the memory, it is possible to prevent illegal rewriting of the use starting information.

Generally, in many cases, such an electric power unit is configured so as to be removable from the destination device, so that it is not always connected to the destination device.

This is why the electric power controller and the electric power controlling method of the present invention should preferably be controlled so that the use starting information of the electric power unit is stored in the memory in case the electric power unit is connected to a destination device. Consequently, accurate use starting information can be stored surely in the memory.

Furthermore, it is possible to decide that the electric power unit is connected to the destination device in case the voltage or current supplied from the electric power unit is over its corresponding predetermined value.

On the other hand, in case the electric power controlling method of the present invention applies to a computer provided with a CPU, a storage device, a display device, an input device, and the electric power unit of the present invention that are connected to each another via a bus respectively, the storage device can be employed as a recording medium readable from the computer so as to realize the above application. In this case, it is premised that the recording medium stores a program for controlling the electric power unit according to the electric power controlling method of the present invention. And, the computer can know the use starting information of the built-in electric power unit by reading the information from the memory, since the information is stored in the memory as described above.

Furthermore, in case the electric power controlling method of the present invention applies to a computer provided with a CPU, a storage device, a display device, an input device, a network connection device, and the electric power unit of the present invention that are connected to each another via a bus respectively, an external storage device of a server computer disposed on the network to which the network connection device is connected can be employed as a recording medium readable from the computer so as to realize the above effect of the present invention. In this case, it is premised that the recording medium stores a program for controlling the electric power unit according to the electric power controlling method of the present invention. And, the computer can know the use starting information of the built-in electric power unit by reading the information from the memory, since the information is stored in the memory as described above.

Preferred Embodiments

Hereunder, the preferred embodiments of the present invention will be described with reference to the accompanying drawings.

First Embodiment

FIG. 1 shows an explanatory view of a hardware configuration of a computer system 10, which is a typical personal computer (PC) to which the present invention is applied. In FIG. 1, the computer system 10 is divided into subsystems. An example of the PC of the present invention is a lap-top PC 12 (see FIG. 2) that conforms to the OADG (PC Open Architecture Developer's Group) specifications and the "Windows98 or NT" (Microsoft Corp., USA) or the "OS/2" (IBM Corp., USA) is installed therein as an operating system (OS). Hereinafter, each component of the computer system 10 will be described.

A CPU 14 that functions as the brain of the whole computer system 10 executes various programs under the control of the OS. The CPU 14 may be any of the "Pentium" that is a CPU chip of Intel Inc. USA, a CPU of another company such as AMD Inc., and the "PowerPC" of IBM Corp., USA.

The CPU 14 is connected to each of the hardware components via a three-layer bus configured by an FS (Front Side) bus 18, which is connected directly to the external pins of the processor (CPU 14) itself; a PCI (Peripheral Component Interconnect) bus 20 used for fast I/O devices; and an ISA (Industry Standard Architecture) bus 22 used for slow I/O devices.

The FS bus 18 and the PCI bus 20 are connected to each other via a CPU bridge (host-PCI bridge) 24 referred to generally as a memory/PCI control chip.

The main memory 16 is a writable memory used as an area in which an execution program of the CPU 14 is read or as a work area in which data processed by the execution program is written.

The execution program mentioned here is, for example, any of such OSs as Windows98 or the like, various device drivers for hardware-operating peripheral devices, application programs dedicated to specific business works, and such firmware programs as the BIOS (Basic Input/Output System: program for controlling the input/output of such hardware devices as a keyboard, a floppy disk drive, etc.) stored in the flash ROM 72.

The PCI bus 20 is of a type enabled to transfer data comparatively fast and the PCI bus 20 is connected to such PCI devices as a card controller 30 which is driven comparatively fast.

The video subsystem 26 is used to execute video-related functions. The subsystem 26 includes a video controller that processes each drawing instruction from the CPU 14 actually, writes the processed drawing information in the video memory (VRAM) once, and reads drawing information from the VRAM so as to display it on a liquid crystal display (LCD) 28 (see FIG. 2) as drawing data.

The PCI bus 20 is connected to a card bus controller 30, an audio subsystem 32, a docking station interface (Dock I/F) 34, and a mini-PCI slot 36 respectively. The card bus controller 30 is used exclusively to connect the bus signal of the PCI bus 20 directly to the interface connector (card bus) of a PCI card bus slot 38. The card bus slot 38 is disposed, for example, on the wall surface of the PC 12 body and enabled to load a PC card 40 conforming to the specifications (ex., "PC Card Standard 95") regulated by PCMCIA (Personal Computer Memory Association)/JEIDA (Japan Electronic Industry Development Association).

The dock I/F 34 is a hardware component used to connect the PC 12 to the docking station (not illustrated). The mini-PCI slot 36 is connected to a network adapter 42 used to connect, for example, the computer system 10 to a network (ex., LAN).

The PCI bus 20 and the ISA bus 22 are connected to each other via an I/O bridge 44. The I/O bridge 44 is provided with a bridging function used between the PCI bus 20 and the ISA bus 22; an IDE (Integrated Drive Electronics) interface function; a USB (Universal Serial Bus) function, etc. The I/O bridge 44 has a real time clock (RTC) built in itself. For example, a device (core chip) referred to as the PIIX4 (Intel, Inc.) can be used as the I/O bridge 44. The IDE interface realized by the IDE interface function is connected to an IDE hard disk drive (HDD) 46 and to the IDE CD-ROM drive 48 via an ATAPI (AT Attachment Packet Interface).

The I/O bridge 44 is provided with a USB port connected to a USB connector 50 provided, for example, on the wall surface of the PC 12 body.

Furthermore, the I/O bridge 44 is connected to an EEPROM 94 via the SM bus. The EEPROM 94 is a non-volatile memory used to hold such information as the password registered by each user, a supervisor password, the serial number of the product, etc. The information in the EEPROM 94 can be rewritten electrically.

The I/O bridge 44 is also connected to an electric power circuit 54. The electric power circuit 54 is provided with such circuits as an AC adapter 62; a battery charger 68 used to charge the main battery 64A or second battery 64B configured as an intelligent battery, and a DC/DC converter 66 used to generate such DC constant voltages as 5V, 3.3V, etc. used for the computer system 10.

The main battery 64A and the second battery 64B in this embodiment are configured so as to conform to the smart battery specifications respectively. The smart battery specifications are developed by Intel Inc., USA and Duracel Inc., USA in cooperation. The specifications enable an electronic circuit built in the battery 64A/64B to communicate the residual battery capacity to a connected external device very accurately. The smart battery specifications also enable the internal memory to store such information as the maker, the serial number, the rated capacity, etc., so that the user can get those information items stored in the memory with various commands specified by the smart battery specifications.

On the other hand, in the core chip that configures the I/O bridge 44 are provided an internal register used to manage the electric power state of the computer system 10 and a logic (state machine) used to manage the electric power state of the computer system 10 including the operation of the internal register.

The logic described above exchanges signals with the electric power circuit 54, thereby recognizing the supply of the electric power to the computer system 10 from the electric power circuit 54. And, according to each command from the logic, the electric power circuit 54 controls the supply of the electric power to the computer system 10.

The ISA bus 22 has a slower data transfer rate than the PCI bus 20. The ISA bus 22 is connected to comparatively slow peripheral devices (not illustrated), such as a flash ROM 72 configured by a super I/O controller 70, an EEPROM, etc.; a CMOS 74; an embedded controller 80 connected to the gate array logic 76; and a keyboard/mouse controller.

The super I/O controller 70 is connected to the I/O port 78. The super I/O controller 70 controls the driving of the floppy disk drive (FDD), the input/output of parallel data via a parallel port, and the input/output of serial data via a serial port.

The flash ROM 72 is a non-volatile memory used to hold such programs as the BIOS, etc. The data stored in this ROM 72 can be rewritten electrically. The CMOS 74 is a non-volatile semiconductor memory connected to a backup electric power source. It functions as fast storage means.

The embedded controller 80 controls the keyboard (not illustrated). The controller 80 also controls the power management controller built therein so as to bear part of the electric power management function in cooperation with the gate array logic 76.

FIG. 3 shows a block diagram of the main battery 64A with respect to the connection between the main battery 64A and each of other components. As shown in FIG. 3, the main battery 64A in the first embodiment is configured by a CPU 102 that controls the operation of the whole main battery 64A; a memory 104 that stores various data items; a battery 106 configured by three lithium-ion batteries of a 4.2V rated voltage disposed serially; a thermistor 108 that detects the temperature of the battery 106; and four external terminals T1 to T4. The memory 104 may be such a rewritable non-volatile memory as an EPROM, an EEPROM, a flash EEPROM, or the like.

One electrode of the battery 106 is connected to the external terminal T1 and the other electrode is connected to the external terminal T3 respectively. The CPU 102 is connected to the memory 104, so that the CPU 102 can write and read various data items in/from the memory 104. And, the CPU 102 is also connected to the external terminal T2, so that the CPU 102 can exchange various information items with external devices. The connection line from the other electrode of the battery 106 to the external terminal T3 is branched and connected to the external terminal T4 via the thermistor 108.

On the other hand, the external terminal T1 is connected to an input terminal of the DC/DC converter 66 included in the internal circuit 120 (a component other than the main battery 64A and the second battery 64B) of the PC 12. The DC/DC converter 66 receives an electric power from the battery 106 via the main battery 64A. The external terminal T2 is connected to the embedded controller 80 of the internal circuit 120, so that the embedded controller 80 can exchange various information items with the CPU 102 of the main battery 64A. The external terminal T3 is connected to the ground terminal of the internal circuit 120 so as to be grounded.

The external terminal T4 is connected to the embedded controller 80, as well as to an output terminal of the DC/DC converter 66, which outputs 5V, via a resistor 110. In case the main battery 64A is not connected to the internal circuit 120, the voltage T becomes 5V at the input terminal of the embedded controller 80 connected to the external terminal T4. The voltage T at this time, when converted to a temperature of the thermistor 108, takes such an unrealistic value as −50° C. On the other hand, in case the main battery 64A is connected to the internal circuit 120, the voltage T takes a value calculated as shown below.

$$T=5 \times Rth/(R1+Eth)$$

Here, Rth denotes a resistance value of the thermistor 108 and R1 denotes a resistance value of the resistor 110. The voltage T, when it is converted to a temperature, takes such a normal value as 30° C. at this time. Consequently, the embedded controller 80 decides that the main battery 64A is connected to the internal circuit 120 in case the temperature corresponding to the voltage T is over a predetermined threshold, which is set to −10° C., for example. In case the temperature corresponding to the voltage T is under the predetermined threshold, the controller 80 can decide that the main battery 64A is not connected to the internal circuit 120.

Sometimes the thermistor 108 is replaced with a resistor. In such a case, the controller 80 can decide that the main battery 64A is not connected to the internal circuit 120 in case the voltage T is 5V and the main battery 64A is connected to the internal circuit 120 in case the voltage is under 5V. In this embodiment, it is just an example that the resistor 110 is connected to an output terminal of the DC/DC converter 66, which outputs 5V. The resistor 110 can also be connected to an output terminal that outputs 3.3V or any other voltage.

The configuration of the second battery 64B is identical to that of the main battery 64A shown in FIG. 3. And, just like the main battery 64A shown in FIG. 3, the external terminals T1 to T4 of the second battery 64B are connected to the DC/DC converter 66, the embedded controller 80, and the ground terminal (none of them is illustrated) respectively.

The PC 12 in this embodiment has a battery pack pit (not illustrated). The main battery 64A and the second battery 64B are fit in this battery pack pit so as to be removable. The main battery 64A and the second battery 64B, when fit in the battery pack pit, are connected to the DC/DC converter 66, the embedded controller 80, and the ground terminal via the external terminals T1 to T4 respectively.

Next, a description will be made for the data stored in the memory 104 in this embodiment with reference to FIG. 4. As shown in FIG. 4, the memory 104 has predetermined areas used to store the data items of, for example, "maker name," "delivery date," "use starting date," "serial number," "barcode number," "battery name," "battery type," "rated capacity," and "rated voltage." The maker stores those data items other than the "use starting date" in the corresponding areas at the delivery time of the battery. In the example shown in FIG. 4, for example, "IBM" and "2000/08/20" are stored as the maker name and the delivery date at the delivery time. The "use starting date" is stored as a default value "0" in the area for storing a date on which the user actually begins using the battery in this embodiment.

Each of the "delivery date" and the "use starting date" to be stored in the memory 104 consists of 16 bits as shown in Table 1.

TABLE 1

| Field | Bits in use | Format | Value range |
| --- | --- | --- | --- |
| Day | 0 ... 4 | Binary 5 bits | 1–31 |
| Month | 5 ... 8 | Binary 4 bits | 1–12 |
| Year | 9 ... 15 | Binary 7 bits | 0–127 |

In the "Year" row, a year counted from 1980 is set. Consequently, the data items denoting "delivery date" and "use starting date" are values obtained from the following expression (1).

$$\text{Date data} = (\text{year} - 1980) \times 512 + \text{month} \times 32 + \text{day} \quad (1)$$

The main battery 64A in this embodiment conforms to the smart battery specifications as described above and a command set as shown in Table 2 is prepared as an example.

TABLE 2

| Function | Code | Access (r/w) | Data |
| --- | --- | --- | --- |
| Maker name | 0x20 | r | Character string |
| Delivery date | 0x1b | r | Unsigned integer |
| Use starting date | 0x3f | r/w | Unsigned integer |
| Serial number | 0x1c | r | Numeric |
| Battery type | 0x22 | r | Character string |
| Rated capacity | 0x18 | r | mAh or 10 mWh |
| Rated voltage | 0x19 | r | mV |

For example, the "maker name" can be read (r) only. The embedded controller 80 sends a command "0x20" to the CPU 102 of the main battery 64A or second battery 64B so as to read this maker name from the memory 104.

The "use starting date" related especially to the present invention can be read (r) and written (w). The embedded controller 80 sends the following data items as commands to the CPU 102 of the main battery 64A or second battery 64B so as to read and write necessary data.

(1) To read . . . "0x3f read"

(2) To write . . . "0x3f write hex 'date data'"

The command related to the "use starting date" in this embodiment is one of the optional commands prepared in advance for the smart battery specifications.

The main battery 64A and the second battery 64B are equivalent to the electric power unit of the present invention. The embedded controller 80 is equivalent to the controller of the present invention. The CPU 102 is equivalent to the information exchange controller of the present invention.

The memory 104 is equivalent to the memory of the present invention. The battery 106 is equivalent to the battery of the present invention. And, the external terminal T4 is equivalent to the terminal of the present invention respectively.

And, in addition to those shown in FIGS. 1 and 3, many more electrical circuits are required to configure the computer system 10. However, because those electrical circuits are already known by the people concerned and they are not so important items for the concept of the present invention, they will be omitted in this specification. And, note that only some of the connections between hardware blocks in FIGS. 1 and 3 are shown in order to simplify the description.

Next, a description will be made for the operation of the PC 12 after the PC 12 is powered, with reference to FIGS. 5 and 6. FIG. 5 is a flow chart of the operations of the BIOS and the embedded controller 80 of the PC 12 after the PC 12 is powered. FIG. 6 is an explanatory view for the flows of various data items after the PC 12 is powered.

In step 200 shown in FIG. 5, the BIOS reads the current date data from the RTC built in the I/O bridge 44 and sends the data to the embedded controller 80. The embedded controller 80 then stores the received date data in the built-in memory (not illustrated).

Each of the processings in and after step 202 are executed by the embedded controller 80 independently of others.

At first, it is checked whether or not the main battery 64A is connected in step 202. In case it is connected (YES), control goes to step 204. This decision is made as described above; in case the temperature in the thermistor 108, which corresponds to the voltage T, is over a predetermined threshold, the decision is YES (connected) and in case the temperature is under the predetermined threshold, the decision is NO (not connected).

In step 204, the embedded controller 80 reads the data from the "use starting date" area in the memory 104 of the main battery 64A. To read this data, the embedded controller 80 sends the command "0x3f read" to the CPU 102 of the main battery 64A. As a result, the embedded controller 80 can get the data in the "use starting date" area of the main battery 64A from the CPU 102.

In the next step 206, the controller 80 checks whether or not the data read from the "use starting date" area in step 204 is normal. In case it is not normal (NO), control goes to step 208. In this embodiment, in case the date data is '0000' in hexadecimal, it is decided as abnormal. Otherwise, it is decided as normal.

In step 208, the controller 80 stores the date data in the "use starting date" area in the memory 104 of the main battery 64A. The date data corresponds to the date data stored in the memory in step 200. Control then goes to step 210. To store the date data, the controller 80 converts the date data to 16-bit date data with use of the expression (1) described above, then sends the command "0x3f write hex 'date data'" to the CPU 102. Consequently, the date on which the PC 12 is powered or the main battery 64A is connected is stored in the "use starting date" area in the memory 104.

On the other hand, in case it is decided in step 202 that the main battery 64A is not connected (NO) or in case it is decided in step 206 that the date data is normal (YES), control goes to step 210.

In step 210, the controller 80 checks whether or not the second battery 64B is connected. In case the battery 64B is connected (YES), control goes to step 212. This decision in step 210 can be made just like for the main battery 64A.

In step 212, the controller 80 reads the data from the "use starting date" area in the memory 104 of the second battery 64B. To read this data, the controller 80 sends the command "0x3f read" to the CPU 102 of the second battery 64B. As a result, the controller 80 can get the data in the "use starting date" of the second battery 64B from the CPU 102.

In the next step 214, the controller 80 checks whether or not the data read from the "use starting date" area of the second battery 64B in step 212 is normal just like for the main battery 64A. In case the data is not normal (NO), control goes to step 216.

In step 216, the controller 80 stores the date data in the "use starting date" area in the memory 104 of the second battery 64B. The date data corresponds to the date data stored in the memory in step 200. Control then goes back to step 202. At this time, the controller 80 converts the date data to 16-bit date data with use of the expression (1) just like for the main battery 64A, then sends the command "0x3f write hex 'date data'" to the CPU 102 of the second battery 64B. Consequently, the date on which the PC 12 is powered or the second battery 64B is connected is stored in the "use starting date" area in the memory 104 of the second battery 64B.

On the other hand, in case it is decided in step 210 that the second battery 64B is not connected (NO) or in case it is decided in step 214 that the date data is normal (YES), control goes back directly to step 202.

Repeating the processings in steps 202 to 216, the embedded controller 80 keeps monitoring of the connection of the main battery 64A or second battery 64B to the internal circuit 120. And, in case at least either the main battery 64A or second battery 64B is connected to the internal circuit 120, the date on which the PC 12 is powered is stored once in the "use starting date" area in the memory 104 built in the connected battery and hereinafter the data is kept as is.

In case the user/maker wants to know the "use starting date" of the main battery 64A or second battery 64B, the user/maker uses the utility program as shown in FIG. 6 so as to get the data from the "use starting date" area in the memory 104 of the main battery 64A or second battery 64B via the embedded controller 80, the BIOS, and the OS, thereby knowing the actual use starting date.

As described above, in case no "use starting date" data is stored in the memory, the PC 12 provided with the main battery and the second battery in this first embodiment controls so that the data is stored in the memory. The user/maker can know the use starting date of the main or second battery actually by reading the "use starting date" data from the memory and protects the battery from illegal rewriting of the date data, since no processing for storing the date data is done in case normal "use starting date" date data is already stored in the memory.

Second Embodiment

While the embedded controller 80 keeps monitoring the connection state of the main battery 64A or second battery 64B so as to store the use starting date in the memory in case the battery is connected in the first embodiment, the utility program is used to store/read the use starting date in the second embodiment. The configuration of each battery and the configuration of the PC 12 other than the connection between each battery and each of other components are identical to those in the first embodiment. The description for them will thus be omitted here, avoiding redundant description.

FIG. 7 shows a block diagram of the main battery 64A' in this second embodiment and the connection between the main battery 64A' and each of other components. In FIG. 7, the same symbols will be given to the same components as those in FIG. 3, the description of which is omitted.

As shown in FIG. 7, the main battery 64A' in the second embodiment are the same as the main battery 64A in the first embodiment except that the battery 64A' is not provided with any of the CPU 102 and the thermistor 108, and the memory 104 is connected to the external terminal T2 directly.

The external terminal T1 of the main battery 64A' configured as described above is connected to an input terminal of the DC/DC converter 66 included in the internal circuit 120' of the PC 12. The DC/DC converter 66 receives an electric power from the battery 106 of the main battery 64A'. The power line from the external terminal T1 to the input terminal of the DC/DC converter 66 is branched in the internal circuit 120' and connected to the embedded controller 80. The embedded controller 80 keeps monitoring the voltage of the power line. In case the voltage is over a predetermined value, the controller 80 decides that the main battery 64A' is connected to the internal circuit 120', thereby an electric power is supplied to the circuit 120'. In the second embodiment, therefore, the external terminal T1 is equivalent to the terminal of the present invention.

On the other hand, the external terminal T2 is connected to the embedded controller 80 of the internal circuit 120' and the embedded controller 80 can write/read various data items in/from the memory 104. In addition, the external terminal T3 is connected to the ground terminal of the internal circuit 120' so as to be grounded.

The second battery is also configured just like the main battery 64A' shown in FIG. 7. And, just like in FIG. 7, the external terminals T1 to T3 of the second battery are connected to the DC/DC converter 66, the embedded controller 80, and the ground terminal (none of them is illustrated) respectively.

Next, a description will be made for the operation of the PC 12 after the PC 12 is powered, with reference to FIG. 8. FIG. 8 shows an explanatory view for the flows of various data items after the PC 12 is powered.

At first, the utility program controls the embedded controller 80 via the OS or BIOS so as to check whether or not the main battery 64A' is connected to the PC 12. As described above, the embedded controller 80 keeps monitoring the connection state of the main battery 64A'. The embedded controller 80, in case the main battery 64A' is connected to the PC 12, communicates information about the fact to the utility program immediately. In case the main battery 64A' is not connected, the embedded controller 80 communicates information about the fact to the utility program when the main battery is connected to the PC 12.

Receiving the connection information from the embedded controller 80, the utility program requests the embedded controller 80 for information about whether or not normal use starting date exists in the "use starting date" area (see FIG. 4, as well) in the memory 104 of the main battery 64A'. Receiving this request, the embedded controller 80 reads the data from the "use starting date" area in the memory 104 of the main battery 64A' so as to check whether or not it is normal. In this embodiment, in case the data is '0000' (hex), the data is decided not to be normal. Otherwise, the data is decided to be normal. In case the data is decided not to be normal, the embedded controller 80 communicates information about the fact to the utility program via the BIOS or OS.

Receiving the information that the data is not normal, the utility program reads the date code from the OS and stores it in the "use starting date" area in the memory 104 of the main battery 64A' via OS, BIOS and the embedded controller 80.

The utility program also executes the above same processings for the second battery.

Consequently, in case at least either the main battery or the second battery is connected to the PC 12, the date on which the PC 12 is powered is stored just once in the "use starting date" area in the memory 104 of the connected battery. Hereinafter, the stored data is kept as is.

Next, a description will be made for another processing of the utility program with reference to FIG. 9. The user or the maker executes this processing so as to know the use starting date of the main or second battery. In this case, it is premised that the utility program is executed to know the use starting date of the main battery 64A'.

At first, the utility program refers the use starting date to the embedded controller 80 via the OS and the BIOS. The embedded controller 80 then reads the date data from the "use starting date" area in the memory 104 of the main battery 64A' and sends the data to the utility program via the BIOS and the OS.

Receiving the date data, the utility program displays the date denoted by the received date data on the LCD 28 of the PC 12.

The utility program, when obtaining the use starting date of the second battery, also executes the same processings as those for the main battery.

Because the PC 12 in this second embodiment enables each of the main battery and the second battery to be provided with a memory just like in the first embodiment and controls so that data denoting the use starting date of the battery is stored in the memory in case the memory stores such the date data, the user and/or the maker can know the actual use starting date of each of the first and second batteries by reading the date data from the memory. In addition, in case normal use starting date is already stored in the memory, no processing is required so as to store the date data. It is thus possible to protect the date data from illegal rewriting.

While a description has been made for writing and reading a battery use starting date in/from a memory with use of a utility program in this second embodiment, the present invention is not limited only to such a case; for example, a device driver, an application program, or the like can be used to do those processings.

The electric power controlling methods described in the above embodiments can be programmed with use various programming languages (hereinafter, such a program will be referred to as an electric power control program).

This electric power control program can be recorded on a recording medium readable from a computer. The recording medium may be any of such portable recording media as a storage device, a floppy disk (FD), a CD-ROM (Read Only Memory that uses a compact disk), and an MO (Magnetic Optical) disk, etc. used for the ROM (Read Only Memory), the EEPROM (Electrically Erasable Programmable Read Only Memory), the flash EEPROM (Flash EEPROM), etc., or any of external storage devices provided for a server computer, etc. connected to a network.

The electric power control program recorded on such a recording medium is read into a computer as follows. In case the recording medium on which the control program is stored is a portable one, the medium is loaded in the drive and the program is read from the portable medium. The read electric power control program is then stored in the main memory.

In case the recording medium is an external storage device connected to a network, the program is down-loaded from the storage device via the network connection device. The down-loaded electric power control program is then stored in the main memory.

Advantages of the Invention

As described above, according to the electric power unit of the present invention, an external device can write/read data in/from the electric power unit provided with at least a memory for storing the battery use starting information. The user and/or the maker can thus read the battery use starting information from the memory so as to know the actual use starting date of the electric power unit. This is an excellent point of the present invention's electric power unit.

And, according to the electric power controller and the electric power controlling method of the present invention, each of the controller and the controlling method controls the electric power unit so that the battery use starting information is stored in the memory of the electric power unit in case the information is not stored in the memory. The user and/or the maker can thus read the battery use starting information of the electric power unit from the memory so as to know the actual use starting date. And, in case the battery use starting information is already stored in the memory, no processing is required so as to store the battery use starting date, so that the battery use starting information can be prevented from illegal rewriting. This is an excellent point of the electric power controller and the electric power controlling method of the present invention.

Furthermore, according to the computer of the present invention, the computer can read the battery use starting information from the memory of the electric power unit built in itself so as to know the actual use starting date. This is an excellent point of the computer of the present invention.

BRIEF DESCRIPTION OF THE DRAWINGS

FIG. 1 is a schematic block diagram of a computer system in one embodiment;

FIG. 2 is a perspective view of a lap-top PC;

FIG. 3 is a block diagram of a main battery of the lap-top PC in a first embodiment with respect to the connection to each of other components;

FIG. 4 is an explanatory view of data stored in a memory 104 in the first embodiment;

FIG. 5 is a flowchart for the operation of the BIOS and the operation of an embedded controller 80 in the first embodiment after the lap-top PC is powered;

FIG. 6 is an explanatory view of flows of various data items in the lap-top PC in the first embodiment;

FIG. 7 is a block diagram of a main battery of a lap-top PC in a second embodiment with respect to the connection to each of other components;

FIG. 8 is an explanatory view of the flows of various data items after the lap-top PC in the second embodiment is powered; and FIG. 9 is an explanatory view of the flows of various data items processed by the utility program executed so as to know the use starting date of the main battery of the lap-top PC in the second embodiment.

Description of Symbols

10 . . . Computer system
54 . . . Electric power circuit
64A, 64A' . . . Main battery (Electric power unit)
64B . . . Second battery (Electric power unit)
80 . . . Embedded controller (Controlling means)
102 . . . CPU (Information exchange controlling means)
104 . . . Memory
106 . . . Battery
108 . . . Thermistor
120, 120' . . . Internal circuit T1 . . . External Terminal
T4 . . . External Terminal

What is claimed is:

1. An electric power unit, comprising:
   a battery enabled to supply an electric power to an external device;
   a controller connected to a memory;
   wherein said memory can be written in automatically without human input by said controller in the course of a setup routine and can be read from by said controller and contains at least use starting information of said battery in a start date location that initially contains a default value and is written to by said controller in said setup routine with a representation of the current date only after said controller reads said start date location and identifies said default value, whereby said use starting information is written only once and represents the time when the use of said battery started.

2. The electric power unit according to claim 1, wherein data can be written in said memory only once.

3. The electric power unit according to claim 1, further comprising a terminal for outputting a signal to said controller, said signal denoting whether or not said battery is supplying an electric power to a destination device.

4. The electric power controlling method according to claim 3, wherein said method decides that said electric power unit is connected to said destination device in case a voltage or current supplied from said electric power unit is over its corresponding predetermined threshold.

5. A recording medium readable from a computer, said medium being enabled to store a program for controlling said electric power unit according to claim 1, said program comprising the steps of performing a set-up method without human input comprising reading said battery use starting information from said start date location of said memory and if said battery use information equals said default value storing the current date in said start date location of said memory and if said battery use information is other than said default value leaving said battery use information in said start date location of said memory, whereby the date of said first use is written only the first time the start date location is read and the date of first use is available for verifying the duration of a warranty.

6. The recording medium readable from a computer according to claim 5, wherein the processing in said step includes a test so that said battery use starting information is stored in said memory only when said electric power unit is connected to a destination device.

7. The recording medium readable from a computer according to claim 6, wherein the processing in said step decides that said electric power unit is connected to said destination device in case a voltage or current supplied from said electric power unit is over its corresponding predetermined threshold.

8. A computer, comprising a CPU, a storage device, a display device, an input device, and an electric power unit that are connected to each another via a bus respectively, said electric power unit being according to claim 1,
   wherein said storage device is enabled to store a program for execution without human input comprising reading said battery use starting information from said start date location of said memory and if said battery use information equals said default value storing the current date in said start date location of said memory and if said battery use information is other than said default value leaving said battery use information in said start date location of said memory, whereby the date of said first use is written only the first time the start date location is read and the date of first use is available for verifying the duration of a warranty.

9. A computer, comprising a CPU, a storage unit, a display unit, an input unit, and a network connection device, and an electric power unit that are connected to each another via a bus respectively, said electric power unit being according to claim 1.
   wherein an external storage device of a sewer computer disposed on a network to which said network connection device is connected is a recording medium readable from a computer, said medium being enabled to store a program for controlling said electric power unit, said program steps executed without human input comprising reading said battery use starting information from said start date location of said memory and if said battery use information equals said default value storing the current date in said start date location of said memory and if said battery use information is other than said default value leaving said battery use information in said start date location of said memory, whereby the date of said first use is written only the first time the start date location is read and the date of first use is available for verifying the duration of a warranty.

10. The electric power unit according to claim 2, further comprising a terminal for outputting a signal to said external device, said signal denoting whether or not said battery is supplying an electric power to said external device.

11. A computer, comprising a CPU, a storage unit, a display unit, an input unit, and a network connection device, and an electric power unit that are connected to each another via a bus respectively, said electric power unit being according to claim 3,
   wherein an external storage device of a sewer computer disposed on a network to which said network connection device is connected is said recording medium wherein the processing in said step includes a test so that said battery use starting information is stored in said memory only when said electric power unit is connected to a destination device.

* * * * *